(12) United States Patent
Weinstein et al.

(10) Patent No.: US 7,484,914 B1
(45) Date of Patent: Feb. 3, 2009

(54) FIXTURE FOR DRILLING POCKET HOLES IN WORKPIECES OF DIFFERENT THICKNESSES

(75) Inventors: Burton Weinstein, New York, NY (US); Richard H. Deaton, New York, NY (US)

(73) Assignee: General Tools & Instruments Company LLC, New York, NY (US)

( * ) Notice: Subject to any disclaimer, the term of this patent is extended or adjusted under 35 U.S.C. 154(b) by 95 days.

(21) Appl. No.: 11/605,710

(22) Filed: Nov. 28, 2006

(51) Int. Cl.
*B23B 47/28* (2006.01)

(52) U.S. Cl. .................. 408/115 R; 408/103

(58) Field of Classification Search ........... 408/72 R, 408/72 B, 97, 103, 108, 109, 115 R, 115 B, 408/241 B
See application file for complete search history.

(56) References Cited

U.S. PATENT DOCUMENTS

| | | | | |
|---|---|---|---|---|
| 2,838,966 A | * | 6/1958 | Campbell | 408/115 R |
| 3,788,759 A | * | 1/1974 | Grunert | 408/115 R |
| 5,676,500 A | * | 10/1997 | Sommerfeld | 408/103 |
| 6,254,320 B1 | * | 7/2001 | Weinstein et al. | 408/103 |
| 6,726,411 B2 | * | 4/2004 | Sommerfeld et al. | 408/1 R |
| 7,101,123 B1 | * | 9/2006 | Weinstein et al. | 408/103 |
| 2005/0089381 A1 | * | 4/2005 | Liu et al. | 408/115 R |
| 2006/0228180 A1 | * | 10/2006 | Sommerfeld et al. | 408/115 R |

* cited by examiner

*Primary Examiner*—Daniel W Howell
(74) *Attorney, Agent, or Firm*—Gordon D. Coplein

(57) ABSTRACT

A fixture for drilling a pocket hole in a working face of workpieces of different thicknesses is a U-shaped member having a guide leg and a clamp leg parallel to each other and joined together at a bottom end of each by a transverse base leg. An angled guide channel is in the guide leg that has an entrance for a drill bit on an exterior part of the guide leg and an exit on an interior face which opposes the workpiece working face. A plurality of horizontal elongated ribs are spaced vertically apart on the guide leg interior below the guide channel exit and there is a shelf having a face on which a second face of the workpiece that is transverse to the working face is to rest and that has an edge with a plurality of horizontal vertically spaced ribs to inter-engage with the ribs on said guide leg. A screw extends outwardly from the shelf to extend through a slot in the guide leg and a nut fastens the screw against the guide leg to hold opposing ribs of the guide leg and shelf inter-engaged. Selection of the point of inter-engagement of the ribs sets the height of the shelf support for the workpiece relative to the drill guide channel exit.

10 Claims, 3 Drawing Sheets

FIXTURE FOR DRILLING POCKET HOLES IN WORKPIECES OF DIFFERENT THICKNESSES

FIELD OF THE INVENTION

The invention relates to a fixture for drilling pocket holes in workpieces of different thicknesses.

BACKGROUND OF THE INVENTION

The use of fixtures for location and guidance of a drill bit to drill holes in a workpiece, such as a piece of wood, for pocket joints is well known. A pocket hole is one that is made at an angle in a working face of the wood workpiece and a screw is inserted into the hole to join the workpiece to another wood piece. The screw is recessed in the pocket hole and is not exposed.

U.S. Pat. No. 6,254,320, which is owned by the assignee of the subject application and the disclosure of which is incorporated herein by reference, discloses a relatively simple fixture for making pocket holes in a workpiece. In accordance with the invention of that patent, the fixture is U-shaped, with one leg being a guide leg against whose interior the broad working face of the workpiece in which a pocket hole to be drilled rests. The guide leg has angled channels to accept and guide a drill bit. There is a clamp leg opposite to the guide leg that has a threaded hole through which a screw clamp facing the guide leg passes and a base leg connects the guide and clamp legs to complete the U.

In the use of the fixture of U.S. Pat. No. 6,254,320, the narrow edge of the workpiece rests on the interior of the base leg and the broad working face in which the pocket hole is to be drilled is clamped against the interior surface of the guide leg by adjusting the threaded clamp to engage the opposite workpiece face. The distance between the base leg interior and drill bit guide channel exit sets the point on the workpiece at which the pocket hole is drilled. The clamp holds the workpiece securely against the guide leg while the drill bit is advanced through the angled guide channel to make an angled pocket hole in the workpiece. The fixture of the patent is simple in construction and efficient in operation permitting precise drilling of a pocket hole in a workpiece. However, it has a limitation in that its use is substantially limited to a workpiece of one thickness which is basically determined by the distance between the exit of the guide channel for the drill bit and the upper interior surface of the base leg on which the workpiece narrow edge rests.

U.S. Pat. No. 7,101,123, which also is owned by the assignee of this application and whose disclosure is incorporated by reference, discloses fixtures for drilling pocket holes in workpieces of different thicknesses by providing the fixture with the ability to vary the distance between the drill bit guide channel exit and the surface, or floor, on which the workpiece narrow edge rests. In one embodiment of this patent, a shelf is provided that is held between opposing sets of slots in or shoulders on the opposing faces of the guide leg and clamp leg. These slots or shoulders are spaced vertically apart and the workpiece edge rests on the shelf. The shelf is vertically adjustably positioned relative to the drill bit guide channel exit by selecting the set of slots in, or shoulders on, which it is placed. Each of the shelf vertical positions sets a different distance of the working face of the workpiece in which the pocket hole is to be drilled relative to the drill bit guide channel exit. This permits workpieces of different thicknesses to be accommodated for drilling of the pocket hole.

In another embodiment of U.S. Pat. No. 7,101,123, a shelf on which the workpiece edge rests has a neck that slides vertically in a cavity in the guide leg and the vertical position of the shelf is set by an adjustable screw that is threaded vertically through the top of the guide leg into the shelf neck. The vertical height of the shelf relative to the drill bit guide channel exit is set by rotating the screw. This sets the proper height for different thicknesses of workpieces that can be clamped against the guide leg for drilling of the pocket hole in the correct place on the workpiece working face. While this embodiment is fully workable, it has disadvantages in that it is somewhat costly to make. Also, the only point of stability for the shelf is the neck that is in the guide leg cavity and downward force on the shelf and workpiece can strip the vertical shelf positioning screw in the guide leg. Therefore, the shelf may not remain perfectly transverse to the guide wall at the desired height when loaded by the workpiece and added force is applied during drilling of a pocket hole.

BRIEF DESCRIPTION OF THE INVENTION

In accordance with the invention, a fixture for drilling a pocket hole is provided that uses inter-engaging ribs on a shelf and fixture guide leg for improving the stability of the shelf. The fixture is U-shaped, preferably an extrusion, having a vertical guide leg against whose interior the broad working face of the workpiece in which a pocket hole to be drilled rests. The guide leg has one or more angled channels to accept and guide a drill bit. There is a clamp leg opposite to the guide leg that has a threaded hole through which a screw clamp facing the guide leg passes and a base leg that connects the bottom ends of the guide and clamp legs to complete the U.

A plurality of horizontal ribs are vertically spaced apart on the inner wall of the guide leg and a vertical slot is formed through the guide leg in the area of the ribs. A shelf is provided that has a side edge on which there are a plurality of horizontal, vertically spaced ribs. In a preferred embodiment, a vertical wall extends from the side edge and the ribs are formed on this wall. The ribs on the e shelf oppose and match the ribs on the fixture guide leg. A screw is fixed to the shelf and extends transversely outwardly through the fixture guide wall slot. The vertical position of the shelf is set by matching the opposing ribs of the guide leg and shelf and tightening a wing nut on the screw against the guide leg outer surface. This adjustably sets the height of the surface of the shelf on which the edge of the workpiece is to rest relative to the exit of the drill bit channel. A clamp screw is tightened against the broad face of the workpiece opposing the working face in which the pocket hole is to be drilled. Stable support is provided by the inter-engagement of plurality of the horizontal ribs along an extended length of the shelf.

BRIEF DESCRIPTION OF THE DRAWINGS

Other objects and advantages of the present invention will become more apparent upon reference to the following specification and annexed drawings, in which.

DETAILED DESCRIPTION OF THE INVENTION

Figure 1:
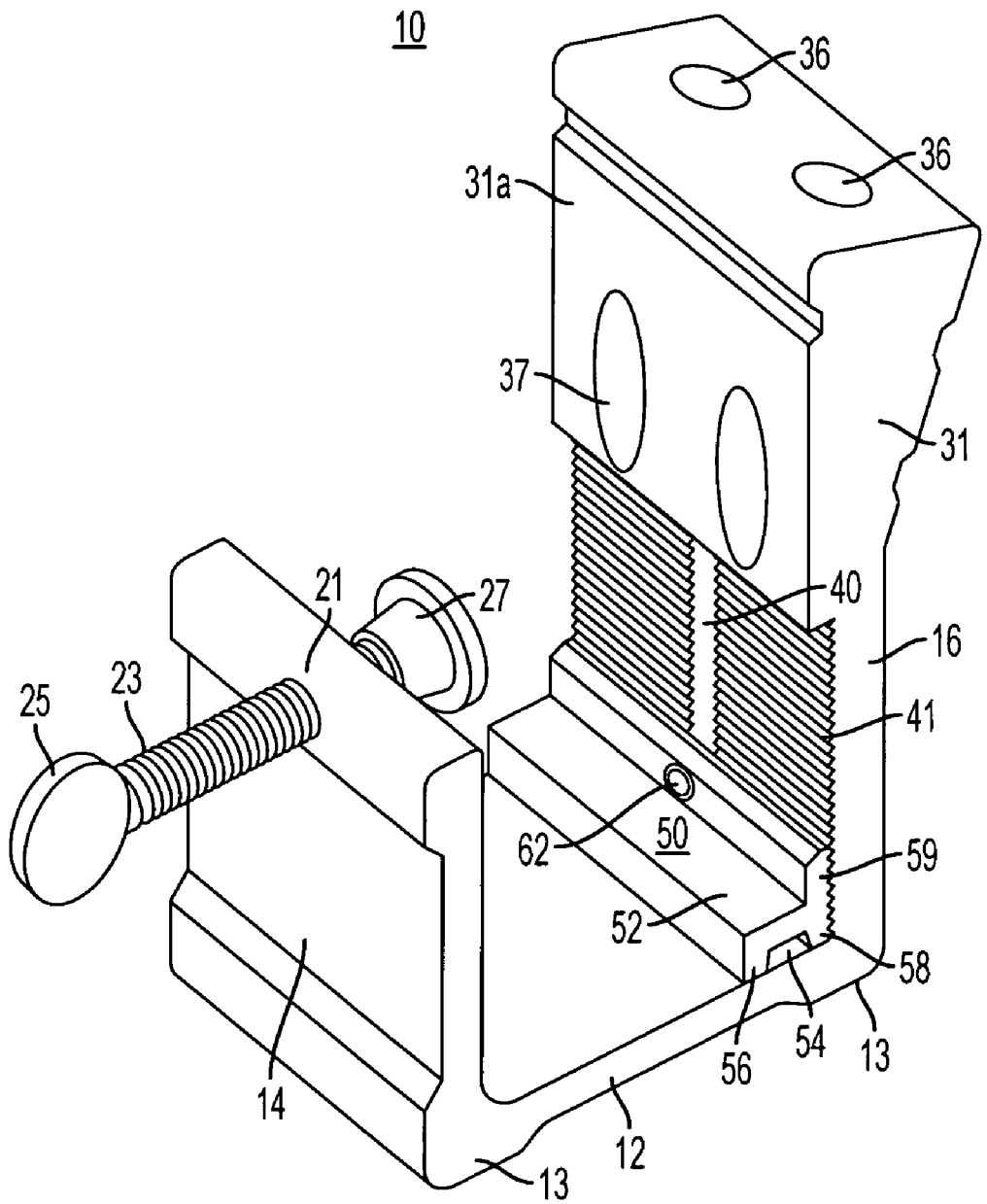
FIG. 1 is an elevational front perspective view of the fixture of the invention showing a preferred embodiment of a shelf.
Figure 2:
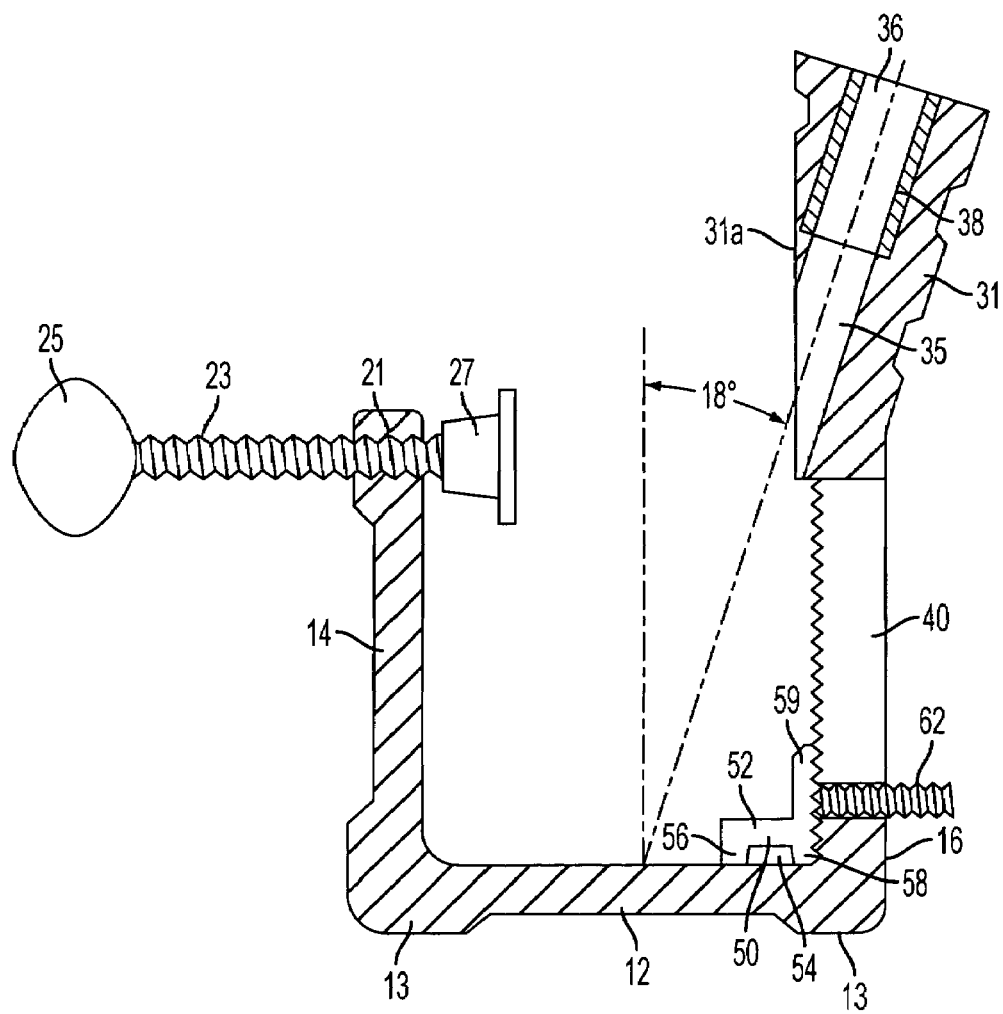
FIG. 2 is an elevational cross-section of the fixture of FIG. 1.

Referring to FIGS. 1-2, the fixture 10 is generally U-shaped and can be made of any suitable construction, such as an extrusion, a casting or welded pieces. An aluminum extrusion is preferred since it is relatively inexpensive. Any suitable material can be used. The fixture has a horizontal base leg 12 which connects two opposing vertical legs 14 and 16, hereafter referred to as the clamp leg and the guide leg, that are parallel to each other and transverse to the base leg 12. The outer surface of the base leg 12 has a foot 13 at each corner where it joins the clamp leg 14 and the guide leg 16 for the fixture to rest on a flat surface and also to serve as reinforcements. One or more holes (not shown) can be made through the base leg to permit passage of one or more screws (also not shown) to secure the fixture to a surface, such as a workbench.

The clamp leg 14 is transverse to the base leg 12 and has a threaded hole 21 to accept a threaded thumb screw clamp 23 having a thumb engaging piece 25 exterior to the fixture and a workpiece (not shown) surface engaging cap 27 interior of the fixture. The workpiece typically is a board that has opposing broad faces and narrow ends and the board is of any thickness, for example from ½" to 2", that can be accommodated by the fixture. The position of cap 27 relative to the opposing guide leg 16 is controlled by turning the screw 23. While the cap 27 is shown as having a circular outer face of only somewhat greater diameter than the screw 23, it can be enlarged to provide a larger area for engaging the workpiece.

The inner face of the guide leg 16 is transverse to the inner face of the base leg 12. The guide leg has an upper part 31 that flares outwardly at the angle that the pocket hole is to be drilled. As seen, guide leg 16 tapers from a thick upper part 31 to the thinner bottom part which joins to the base leg 12.

A pair of spaced angled guide channels 35 are formed in the thick upper part 31 of guide leg 16. The number of guide channels 35 and the spacing between the channels can be selected as desired and there can be only a single channel. The interior of one of the channels 35 is described referring to FIG. 2 and the description of the other channel would be the same. The channel 35 has an entrance 36 at the top of the guide leg 16 thick part 31 and an exit 37 on the interior 31a of the guide leg for a drill bit (not shown) which is rotated by a drill (also not shown). A bushing 38 of a hardened metal preferably is located in the channel 35 to set the size of the drill bit to be accepted and to withstand wear caused by the rotating drill bit. The angle of each channel 35 in guide leg 16 upper part 31 is the angle to be made for the pocket hole in the workpiece. This is illustratively shown as 18° from a line vertical to the base although any other suitable angle can be used. The exit 37 of channel 35 on the interior of the guide leg is of generally elliptical shape since the channel is at an angle to the guide leg.

The lower part of the guide leg 16, from the upper surface of the base leg 12 to somewhat below the guide channel exits 37 is recessed relative to the interior wall 31a of upper thicker part 31 of the guide leg 16. The interior wall 31a is flat to engage the broad working face of the workpiece in which the pocket hole is to be drilled. A number of horizontal ribs 41, that are parallel to the base leg are formed vertically spaced apart on the interior of the guide leg 16 lower portion from the interior upper surface of the base leg 12 to the beginning of the guide leg thickened portion 31. The ribs 41 are generally V-shaped. A vertical slot 40 that is transverse to the horizontal ribs 41 extends through the guide leg 16 in about the center of the area of the ribs 41. The bottom of the slot 40 can start slightly above the base leg 12 interior surface.

Figure 3:
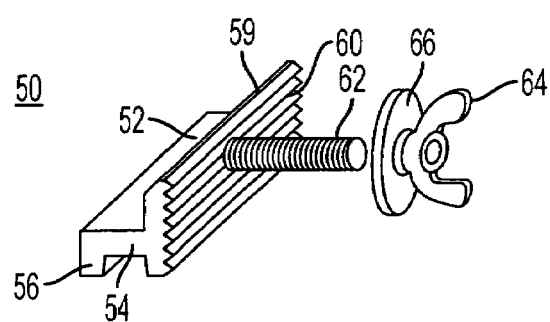
FIG. 3 is a rear perspective view of the shelf of the fixture of FIG. 1.

A shelf 50, shown in detail in FIG. 3, has an upper flat side 52 and a lower side with a recess 54 between an outer edge ridge 56 and an inner edge ridge 58. A wall 59 extends above and transverse to the shelf upper flat side 52 and is basically an extension of the ridge 58. The inner surface of the vertical wall 59 is aligned with the inner surface 31a of the guide leg thick upper part 31. It is preferred that the length of the shelf be about the same as that of the length of the guide leg ribs 41. The outer face of the extending wall 59 has a plurality of horizontal vertically spaced ribs 60 that match and inter-fit with the ribs 41 on the guide leg 16. A threaded screw 62 without a head is fixed to and extends transversely outwardly from the shelf vertically extending wall 59. There is a separate wing nut 64 that fits screw 62 that has an attached washer 66.

In an alternative embodiment, there can be ribs 60 on an edge of the shelf over its entire thickness. That is, the shelf would be essentially flat on both sides and relatively thick.

In the use of the fixture 10, the user passes the screw 62 through the guide wall slot 40. The ribs 60 of the shelf inter-engage with the guide leg ribs 41 to set the height of the shelf upper surface 52 relative to the exits 37 of the channels 35. The wing nut 64 is tightened on screw 62 until the washer 66 firmly engages the guide leg 16 outer surface. The shelf 50 is now mounted to the guide leg 16 and is stable to support the edge of the workpiece since it is supported on the guide wall by the multiple vertically spaced inter-engaged ribs across the entire length of the shelf. The bottom end of the broad surface of the workpiece is placed against the inner surface of the shelf vertical wall 59 and an upper part of the workpiece broad working face will be against the aligned inner surface 31a of the guide leg thick upper part 31. The clamp leg thumb screw 25 is tightened until the cap 35 engages the broad face of the workpiece opposite the working face to press the working face firmly against the flat wall 31a of the guide leg 16 thick part 31.

The vertical spacing of the ribs 41 on the guide wall and 60 on the shelf extending part preferably correspond to different standard thicknesses of workpieces in which the pocket holes are to be drilled. The vertical spacing between adjacent ribs can be of fixed increments, such as ⅛ inch apart.

The shelf 50 can be inverted from the position shown in FIGS. 1-3. By doing so, a thin workpiece can be paced in the pocket 54 between the two ridges 56 and 58. The operation of the fixture is as described above.

Figure 4:
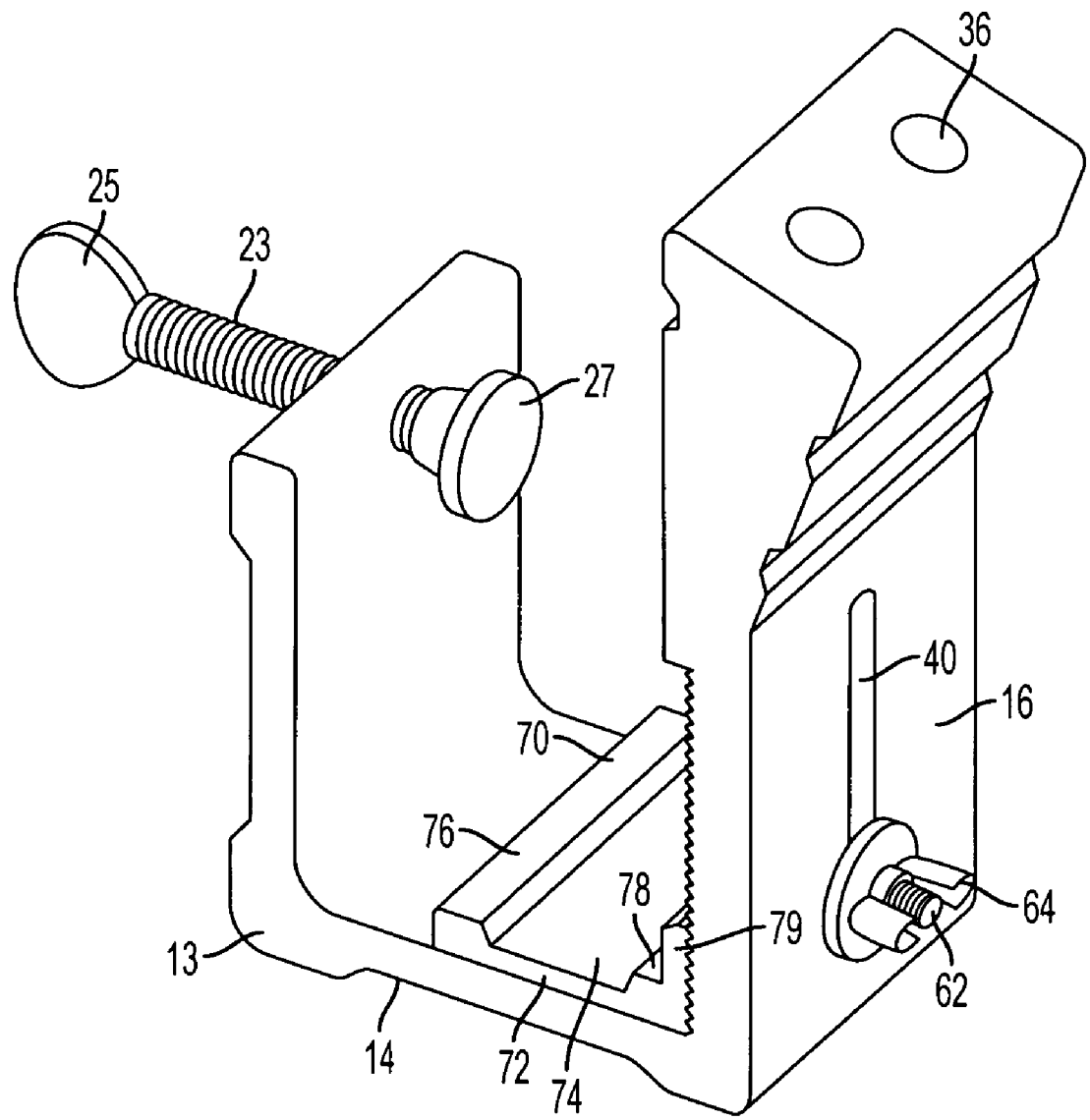
FIG. 4 is a side elevational perspective view of the fixture showing another embodiment of the shelf.

FIG. 4 shows a modified embodiment of the invention in which all parts of the fixture are the same as described above, except for the shelf, and the same reference numbers are used as appropriate. In FIG. 4, the shelf 70 has a base with a flat lower face 72 shown resting on the interior surface of base leg 12. Two ridges 76 and 78 extend upwardly from the upper face of the shelf and are of the same height so that their upper surfaces will be parallel. There is a pocket 74 between the two ridges. In use, after selecting the height of the shelf relative to the exit of the guide channel 35 and tightening the wing nut 64 on the screw 62, the workpiece edge is place on the two ridges 76 and 78 and the clamp screw 23 is tightened to secure the workpiece working face against the inner face 31a of the guide leg thick part 31. The shelf 70 is not as versatile as the shelf 50 because it cannot be inverted to use the flat face 72 as a support.

Specific features of the invention are shown in one or more of the drawings for convenience only, as each feature may be combined with other features in accordance with the invention. Alternative embodiments will be recognized by those skilled in the art and are intended to be included within the scope of the claims. Accordingly, the above description should be construed as illustrating and not limiting the scope of the invention. All such obvious changes and modifications are within the patented scope of the appended claims.

We claim:

1. A fixture for drilling a pocket hole in a workpiece working face, said fixture comprising:
   a U-shaped member having a guide leg and a clamp leg parallel to each other and joined together at a bottom end of each by a transverse base leg;
   a guide channel formed in said guide leg at an angle to said guide leg and having an entrance for a drill bit on an exterior part and an exit at an interior surface which opposes the workpiece working face;
   a plurality of elongated ribs formed on the interior of said guide leg below said guide channel exit, said ribs being parallel, spaced apart and transverse to the vertical axis of said guide leg, and a slot through said guide leg in the area of said plurality of guide leg ribs that is transverse to said plurality of ribs;
   a shelf on which a second face of the workpiece that is transverse to the workpiece working face is to rest, said shelf having an edge with a plurality of parallel and vertically spaced ribs to inter-engage at a selected place on said guide leg with said guide leg ribs; and
   a screw that extends outwardly from said shelf edge to extend through said slot, wherein the part of the guide leg interior having said ribs is recessed relative to the portion having said guide channel exit and said shelf includes a wall extending above one side of said shelf and whose inner surface is aligned with the part of said guide leg inner surface having said guide channel exit.

2. The fixture as claimed in claim 1 and further comprising a nut to fit on said screw to tighten against the outer surface of said guide leg.

3. The fixture as claimed in claim 2 further comprising an adjustable screw in said clamp leg to engage the broad face of the workpiece opposite the working face to clamp the working surface against the interior of said guide leg.

4. The fixture as claimed in claim 1 wherein said one side of said shelf interior of said extending wall is flat.

5. The fixture as claimed in claim 4 wherein said shelf further comprises on its other side spaced apart ridges, and said shelf is reversible so that the second surface of the workpiece can rest on either side of the shelf.

6. A fixture for drilling a pocket hole in a workpiece working face, said fixture comprising:
   a U-shaped member having a guide leg and a clamp leg parallel to each other and joined together at a bottom end of each by a transverse base leg;
   a guide channel formed in said guide leg at an angle to said guide leg and having an entrance for a drill bit on an exterior part and an exit at an interior surface which opposes the workpiece working face;
   a plurality of elongated ribs formed on the interior of said guide leg below said guide channel exit, said ribs being parallel, spaced apart and transverse to the vertical axis of said guide leg, and a slot through said guide leg in the area of said plurality of guide leg ribs that is transverse to said plurality of ribs;
   a shelf on which a second face of the workpiece that is transverse to the workpiece working face is to rest, said shelf having an edge with a plurality of parallel and vertically spaced ribs to inter-engage at a selected place on said guide leg with said guide leg ribs; and
   a screw that extends outwardly from said shelf edge to extend through said slot, wherein one side of said shelf is flat an there are spaced apart ridges on the other side of said shelf, one of said ridges having and extending wall whose inner surface is aligned with the part of said guide leg inner surface having said guide channel exit, and the shelf ribs being on the outer surface of said extending wall.

7. The fixture as claimed in claim 6 and further comprising a nut to fit on said screw to tighten against the outer surface of said guide leg.

8. The fixture as claimed in claim 7 further comprising an adjustable screw in said clamp leg to engage the broad face of the workpiece opposite the working face to clamp the working surface against the interior of said guide leg.

9. The fixture as claimed in claim 1 wherein said shelf extends only part way between said guide leg and said clamp leg.

10. The fixture as claimed in claim 6 wherein said shelf extends only part way between said guide leg and said clamp leg.

* * * * *